(12) United States Patent
Carollo et al.

(10) Patent No.: US 10,345,602 B2
(45) Date of Patent: Jul. 9, 2019

(54) MICRODISPLAY BASED IMMERSIVE HEADSET

(71) Applicant: eMagin Corporation, Hopewell Junction, NY (US)

(72) Inventors: Jerome T. Carollo, Carlsbad, CA (US); Amal Ghosh, Hopewell Junction, NY (US); John C. Ho, Woodinville, WA (US); Andrew T. Rosen, Lynnwood, WA (US)

(73) Assignee: Sun Pharmaceutical Industries Limited, Mumbai (IN)

( * ) Notice: Subject to any disclaimer, the term of this patent is extended or adjusted under 35 U.S.C. 154(b) by 0 days.

(21) Appl. No.: 15/646,390

(22) Filed: Jul. 11, 2017

(65) Prior Publication Data

US 2018/0024370 A1    Jan. 25, 2018

Related U.S. Application Data

(63) Continuation of application No. 15/149,735, filed on May 9, 2016, now Pat. No. 9,733,481, which is a
(Continued)

(51) Int. Cl.
*G02B 27/01* (2006.01)
*G09G 5/00* (2006.01)
(Continued)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC ............ G02B 27/0176; G02B 27/0172; G02B 27/0179; G02B 2027/0149;
(Continued)

(56) References Cited

U.S. PATENT DOCUMENTS

| 5,281,957 A | 1/1994 | Schoolman |
| 5,347,400 A | 9/1994 | Hunter |

(Continued)

FOREIGN PATENT DOCUMENTS

| DE | 102013201773 A1 | 8/2014 |
| WO | WO-1997033270 A1 | 9/1997 |
| WO | WO-2008096719 A1 | 8/2008 |

OTHER PUBLICATIONS

Invitation to Pay Additional Fees and Partial International Search Report for International Patent Application No. PCT/US2015/057100 dated Apr. 8, 2016 (7 pages).
(Continued)

*Primary Examiner* — Sardis F Azongha
(74) *Attorney, Agent, or Firm* — Goodwin Procter LLP

(57) ABSTRACT

An immersive headset device is provided that includes a display portion and a body portion. The display portion may include microdisplays having a compact size. The microdisplays may be movable (e.g., rotational) relative to the body portion and can be moved (e.g., rotated) between a flipped-up position and a flipped-down position. In some instances, when the microdisplays are flipped up, the headset provides an augmented reality (AR) mode to a user, and when the microdisplays are flipped down, the headset provide a virtual reality (VR) mode to the user. In certain implementations, the headset includes an electronics source module to provide power and/or signal to the microdisplays. The electronics source module can be attached to a rear of the body portion in order to provide advantageous weight distribution about the head of the user.

32 Claims, 10 Drawing Sheets

Related U.S. Application Data continuation of application No. 14/921,750, filed on Oct. 23, 2015, now Pat. No. 9,366,871.

(60) Provisional application No. 62/068,467, filed on Oct. 24, 2014.

(51) Int. Cl.
  *H04N 13/286* (2018.01)
  *G06T 19/00* (2011.01)

(52) U.S. Cl.
  CPC .......... *G06T 19/006* (2013.01); *G09G 5/005* (2013.01); *H04N 13/286* (2018.05); *G02B 2027/0132* (2013.01); *G02B 2027/0152* (2013.01); *G02B 2027/0154* (2013.01); *G02B 2027/0156* (2013.01); *G02B 2027/0161* (2013.01); *G02B 2027/0169* (2013.01); *G02B 2027/0178* (2013.01); *G02B 2027/0181* (2013.01); *G09G 2360/10* (2013.01)

(58) Field of Classification Search
  CPC .... G02B 2027/0154; G02B 2027/0159; G02B 2027/017; G06T 19/006; G09G 5/005; H04N 13/0285
  See application file for complete search history.

(56) References Cited

U.S. PATENT DOCUMENTS

| | | |
|---|---|---|
| 5,539,422 A | 7/1996 | Heacock et al. |
| 5,612,708 A | 3/1997 | Ansley et al. |
| 5,696,521 A | 12/1997 | Robinson et al. |
| 5,726,807 A | 3/1998 | Nakaoka et al. |
| 5,737,012 A | 4/1998 | Tabata et al. |
| 5,739,893 A | 4/1998 | Karasawa et al. |
| 5,796,374 A | 8/1998 | Cone et al. |
| 5,954,642 A | 9/1999 | Johnson et al. |
| 5,971,538 A | 10/1999 | Heffner |
| 6,177,952 B1 | 1/2001 | Tabata et al. |
| 6,424,321 B1 | 7/2002 | Ronzani et al. |
| 6,822,623 B2 | 11/2004 | Kim et al. |
| 7,193,783 B2 | 3/2007 | Willey et al. |
| 7,310,072 B2 | 12/2007 | Ronzani et al. |
| 7,414,792 B2 | 8/2008 | Domjan et al. |
| 7,593,757 B2 | 9/2009 | Yamasaki |
| 7,667,783 B2 | 2/2010 | Hong et al. |
| 8,355,208 B1 | 1/2013 | Baker et al. |
| 8,477,425 B2 | 7/2013 | Border et al. |
| 8,488,246 B2 | 7/2013 | Border et al. |
| 8,511,827 B2 | 8/2013 | Hua et al. |
| 8,638,498 B2 | 1/2014 | Bohn et al. |
| 8,643,568 B2 | 2/2014 | West et al. |
| 8,982,471 B1 | 3/2015 | Starner et al. |
| 9,001,427 B2 | 4/2015 | Jacobs et al. |
| 9,025,252 B2 | 5/2015 | Lewis et al. |
| 9,097,890 B2 | 8/2015 | Miller et al. |
| 9,146,397 B2 | 9/2015 | Jacobs et al. |
| 2006/0250322 A1 | 11/2006 | Hall et al. |
| 2007/0075917 A1 | 4/2007 | Nishi |
| 2007/0237491 A1 | 10/2007 | Kraft |
| 2008/0158506 A1 | 7/2008 | Fuziak |
| 2008/0309588 A1 | 12/2008 | Miyake et al. |
| 2009/0243965 A1 | 10/2009 | Price et al. |
| 2010/0205777 A1 | 8/2010 | Kim |
| 2012/0002046 A1 | 1/2012 | Rapoport et al. |
| 2012/0038543 A1 | 2/2012 | Martin et al. |
| 2012/0056847 A1 | 3/2012 | Milford |
| 2012/0162764 A1 | 6/2012 | Shimizu |
| 2012/0242698 A1 | 9/2012 | Haddick et al. |
| 2013/0007668 A1 | 1/2013 | Liu et al. |
| 2013/0176626 A1 | 7/2013 | Heinrich et al. |
| 2013/0293577 A1 | 11/2013 | Perez et al. |
| 2013/0342571 A1 | 12/2013 | Kinnebrew et al. |
| 2014/0043213 A1 | 2/2014 | Park et al. |
| 2014/0071024 A1 | 3/2014 | Fu |
| 2014/0266986 A1 | 9/2014 | Magyari |
| 2014/0320974 A1 | 10/2014 | Magyari |
| 2014/0333773 A1 | 11/2014 | Davis et al. |
| 2014/0340424 A1 | 11/2014 | Ellsworth |
| 2014/0375542 A1 | 12/2014 | Robbins et al. |
| 2015/0042679 A1 | 2/2015 | Jarvenpaa |
| 2015/0103152 A1 | 4/2015 | Qin |
| 2015/0103306 A1 | 4/2015 | Kaji et al. |
| 2015/0109576 A1 | 4/2015 | Krasnow et al. |
| 2015/0198807 A1 | 7/2015 | Hirai |
| 2015/0234189 A1 | 8/2015 | Lyons |
| 2016/0019720 A1 | 1/2016 | Thurber et al. |
| 2016/0370588 A1* | 12/2016 | Parker .................. G02B 27/017 |

OTHER PUBLICATIONS

International Search Report and Written Opinion for Application No. PCT/US2015/057100, dated Jun. 20, 2017.

* cited by examiner

| Feature | Min. value | Nominal value | Max. value | (units) |
|---|---|---|---|---|
| Microdisplay diagonal | 0.5 | 1 | 1.5 | inches |
| Display portion weight | 100 | 260 | 500 | grams |
| Body portion weight | 50 | 200 | 400 | grams |
| Headset weight | 150 | 460 | 900 | grams |
| Aspect ratios of images displayed by microdisplay | 1:4 | 1:1 | 4:1 | |
| Display resolution of images displayed by microdisplay | 480 x 320 | 2k x 2k | > 2k x 2k | pixels |
| Angular resolution of images displayed by microdisplay | 1.0 | 2.4 | 5.0 | arc min/pixels |
| Range of rotational motion of display portion | 0 | 90 | 180 | degrees |
| Range of IPD adjustment | 55 | 63 | 70 | inches |
| Range of in/out adjustment | 0.25 | 0.5 | 1 | inches |
| Voltage | 6 | 12 | 18 | volts |
| Current | 1.0 | 2.0 | 3.0 | amps |
| Field-of-View | 30 | 110 | 210 | degrees |

FIG. 2

MICRODISPLAY BASED IMMERSIVE HEADSET

CROSS-REFERENCE TO RELATED APPLICATION

This application claims priority to co-pending U.S. patent application Ser. No. 15/149,735 titled "Microdisplay Based Immersive Headset," filed on May 9, 2016, which claims priority to U.S. patent application Ser. No. 14/921,750 titled "Microdisplay Based Immersive Headset," filed on Oct. 23, 2015, which claims priority to U.S. provisional patent application Ser. No. 62/068,467 titled "Micro-Display Based Immersive Head Set Apparatus and Methods," filed on Oct. 24, 2014, the disclosures of all of which are herein incorporated by reference in their entireties.

TECHNICAL FIELD

In general, various embodiments of this invention relate to display technology and, more specifically, to microdisplay technology incorporated into immersive headset devices.

BACKGROUND

Immersive head mounted displays (HMDs) in which a virtual reality (VR) or an augmented reality (AR) is displayed to a user include applications in outdoor activities (e.g., hunting, fishing, bird watching), combat training, and video gaming, among others. Conventional immersive HMDs incorporate relatively large (e.g., 4 inches×2 inches), low-resolution displays similar to those found in smartphones, as well as off-the-shelf commercial lenses. Such displays place limitations on the size, configuration, and function of current HMDs. In addition, conventional HMDs position the displays and associated electronics at a single location (e.g., front) of the headset. This generates a location of highly concentrated weight that can be distracting to a user. For example, many prior art HMDs feature an unbalanced, heavy mass cantilevered at the face of the user. Moreover, location of the electronics at the front of the headset can result in cable placement that is disorganized and distracting to the user.

SUMMARY OF THE INVENTION

An immersive headset device is provided that, in some embodiments, incorporates microdisplay technology, which results in a headset having a smaller form factor and/or more compact configuration than conventional headsets. The headset may include a body portion adapted to be worn on a user's head and a display portion adapted to house one or more displays (e.g., microdisplays). The display portion can move (e.g., rotate or translate) with respect to the body portion between a flipped-down position, in which the displays are directly in the user's line-of-sight; and a flipped-up position, in which the displays are displaced from the user's line-of-sight. The flip-up/flip-down capability can also enable the headset to feature a VR mode and an AR mode. Alternatively, the displays can slide up/down or to each side. In some instances, the headset is in AR mode when the display portion is displaced from the user's line-of-sight (e.g., flipped-up), but still provides an image to the user, for example, by reflecting the image to the user off a reflective structure. When the headset is in AR mode, a user may see into the real world, but also be provided with enhanced/virtual optics, as well. In other instances, the headset is in VR mode when the display portion is directly in the user's line-of-sight (e.g., flipped-down).

In various embodiments, the headset may also feature an electronics source module that provides signal and/or power to the displays. The electronics source module may be located on the body portion at the rear of the user's head, which can result in improved weight balance about the user's head than conventional headsets. Cables from the electronics source module may run along semi-rigid side frames, and in some cases through a hinge (connecting the display portion and body portion) no the displays. The side frames may be connected about the rear of the user's head with a head strap assembly. In some instances, the electronics source module may form part of the strap assembly and ensure the assembly is located in the appropriate location on the user's head. In various implementations, the electronics source module can support single and/or dual inputs/outputs, and data in 2D and/or 3D formats. In certain instances, the display portion also features various adjustment mechanisms (e.g., interpupillary adjust, diopter adjust, alignment adjust, and/or in/out adjust). Such mechanisms may be manufactured as part of the display portion in a single OEM device. In some cases, the adjustment mechanism(s) can be engaged without requiring removal of the headset from a user's head.

In general, in one aspect, embodiments of the invention feature an immersive headset device. The headset may include a body portion adapted to be worn on a head of a user and a display portion movably attached to a front of the body portion. The display portion can have at least one display and may move between an immersed position in which the displays are in a line-of-sight of the user and a non-immersed position. The headset may also include an electronics source module for housing at least one of power and display signal electronics located at a rear of the body portion.

In various embodiments, the body portion may include semi-rigid side frame members, and in some cases, a strap assembly for connecting the semi-rigid side frame members about the rear of the head. The electronics source module may form part of the strap assembly, and in some instances, is shaped to hold the strap assembly in an appropriate location on the head. In some instances, the display portion also includes a diopter adjust mechanism and an interpupillary distance adjust mechanism. In such instances, at least one of the diopter adjust mechanism and the interpupillary distance adjust mechanism may be to be adjusted without removing the headset from the head of the user. In some instances, the display may include one or more microdisplays, which in some cases, have a diagonal dimension in a range from about 0.5 inches to about 1.5 inches. The microdisplays may display an image having a resolution of 1024×576, 1152×648, 1280×720, 1600×900, 1920×1080, 2560×1440, 3840×2160, and/or 1366×768. In some cases, the headset may include two microdisplays, one for each eye of the user. In such cases, each microdisplay may receive an independent input from the electronics source module.

In various embodiments, the display portion may move between the immersed position and the non-immersed position by rotating with respect to the body portion. In such embodiments, the headset may include a hinge mechanism for rotating the display portion with respect to the body portion. In some instances, the electronics source module forms a disk shape. The electronics source module may provide data in both 2D and 3D formats, and some cases, can provide a single and/or dual output. The headset may feature a holding structure (e.g., a spring mechanism, a snap connector, a latch, a catch, a detent, a ratcheting mechanism, etc.) for maintaining the display portion in at least one of the immersed position and the non-immersed position.

In general, in another aspect, embodiments of the invention feature a method of configuring an immersive headset device. The method can include the steps of providing a body portion to be worn on a head of a user; providing a display portion movably attached to a front of the body portion, the display portion having at least one display and being configured to move between an immersed position in which the display is in a line-of-sight of the user and a non-immersed position; and disposing an electronics source module for housing at least one of power and display signal electronics at a rear of the body portion.

In various embodiments, the body portion may include semi-rigid side frame members. In such embodiments, the method can further include interconnecting the semi-rigid side frame members about the rear of the head with a strap assembly. In such embodiments, the electronics source module can form part of the strap assembly. In some instances, the display may include one or more microdisplays, which in some cases, have a diagonal dimension in a range from about 0.5 inches to about 1.5 inches. In some cases, the headset may include two microdisplays, one for each eye of the user. In such cases, the method can further include interconnecting each microdisplay to the electronics source module with an independent input.

In various embodiments, the display portion can move between the immersed position and the non-immersed position by rotating with respect to the body portion. In some instances, the electronics source module forms a disk shape. The electronics source module may provide data in both 2D and 3D formats. In certain embodiments, the method may further include providing a holding structure for maintaining the display portion in at least one of the immersed position and the non-immersed position. The method can also include interconnecting the electronics source module to the display portion with at least one cable.

In general, in another aspect, embodiments of the invention feature an immersive headset device having other features. The headset can include a body portion to be worn on a head of a user and a display portion movably attached to the body portion and having at least one display. In some instance the display portion may transition between a VR mode and an AR mode. In some cases, when the display portion is in the VR mode, the displays are in a line-of-sight of a user; and, when the display portion is in the AR mode, the displays are displaced from the line-of-sight of the user while providing an image to the user.

In various embodiments, the headset can include a reflective structure disposed in the line-of-sight during the AR mode. The reflective structure may include a flat plate combiner. In some instances, the flat plate combiner has both reflective and transmissive properties. In some such instances, when the display portion is in the VR mode, the flat plate combiner is not in the line-of-sight of the user; and when the display portion is in the AR mode, the flat plate combiner is at least partially in the line-of-sight of the user such that (i) the user can see through the flat plate combiner, and (ii) the display reflects the image to the user off the flat plate combiner. The flat plate combiner may have a partially reflective surface, an angular reflective surface, and/or a notch coating. When the display portion is in the AR mode, the flat plate combiner may form an acute angle with the line-of-sight of the user. In certain embodiments, the headset also includes an electronics source module that can (i) make a determination of whether the displays are in the VR mode or the AR mode, and (ii) apply an image correction (e.g., a brightness adjustment, a contrast adjustment, a sharpness adjustment, an image flip, etc.) to the image based on the determination.

In general, in another aspect, embodiments of the invention feature a method of using an immersive headset device. The method may include the steps of wearing a body portion of the immersive headset device about a head of a user; and transitioning a display portion, having at least one display, between a VR mode and an AR mode, such that (i) when the display portion is in the VR mode, the displays are in a line-of-sight of a user, and (ii) when the display portion is in the AR mode, the displays are displaced from the line-of-sight of the user while providing an image to the user.

In various embodiments, the transitioning step can further include transitioning a reflective structure between an AR mode position and a VR mode position, where the reflective structure is disposed in the line-of-sight in the AR mode position. In some cases, the reflective structure includes a flat plate combiner. In some instances, the flat plate combiner has both reflective and transmissive properties. In some such instances, in the VR mode position, the flat plate combiner is not in the line-of-sight of the user; and, in the AR mode position, the flat plate combiner is at least partially in the line-of-sight of the user such that (i) the user can see through the flat plate combiner, and (ii) the display reflects the image to the user off the flat plate combiner. The flat plate combiner may have a partially reflective surface, an angular reflective surface, and/or a notch coating. In the AR mode, the flat plate combiner may form an acute angle with the line-of-sight of the user. In some instances, the method further includes making a determination of whether the displays are in the VR mode or the AR mode, and applying an image correction (e.g., brightness adjustment, a contrast adjustment, a sharpness adjustment, an image flip, etc.) to the image based on the determination.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2 is a chart providing example minimum, maximum, and nominal parameter values for various features of a headset, according to various embodiments.

DESCRIPTION

Embodiments of the technology disclosed herein include an immersive headset that may incorporate technology such as, for example, microdisplays and co-axial reflective optical systems. In some instances, the headset may include a Microdisplay Based Immersive Headset (MBIHS) which exhibits significant advancements over conventional immersive headsets. The MBIHS may be implemented to include a wide field-of-view (e.g., exceeding ninety degrees), which is normally achieved only by using larger displays and conventional refractive optics.

With display technology such as that disclosed herein, embodiments of an MBIHS can be made in a form that is very lightweight and compact. For example, microdisplays that have a diagonal of less than 1 inch (25 mm) can be used. In other embodiments, microdisplays having a diagonal measurement in the range of 0.5 inch to 1.5 inch (13 mm to 38 mm) can be used.

In various embodiments, folded optical systems can be used to facilitate a compact form factor. Examples of co-axial reflective optical systems that can be used with embodiments of the MBIHS include, for example, those described in U.S. Pat. Nos. 6,853,491 and 6,271,969 (and variants thereof), each of which are incorporated by reference herein in their entirety.

The small size of the headset described herein allows it to include features not possible or impractical with conventional immersive headsets that do not incorporate microdisplays. One such feature includes a display portion having a "flip-up"/"flip-down" capability. This allows the user to flip the display portion into and out of the user's line-of-sight, to transition between being immersed in the MBIHS and being able to see the real world. This feature can allow a user to transition between the real world and the virtual environment more rapidly than conventional headsets, without needing to remove and/or reseat the headset.

Figure 1A:
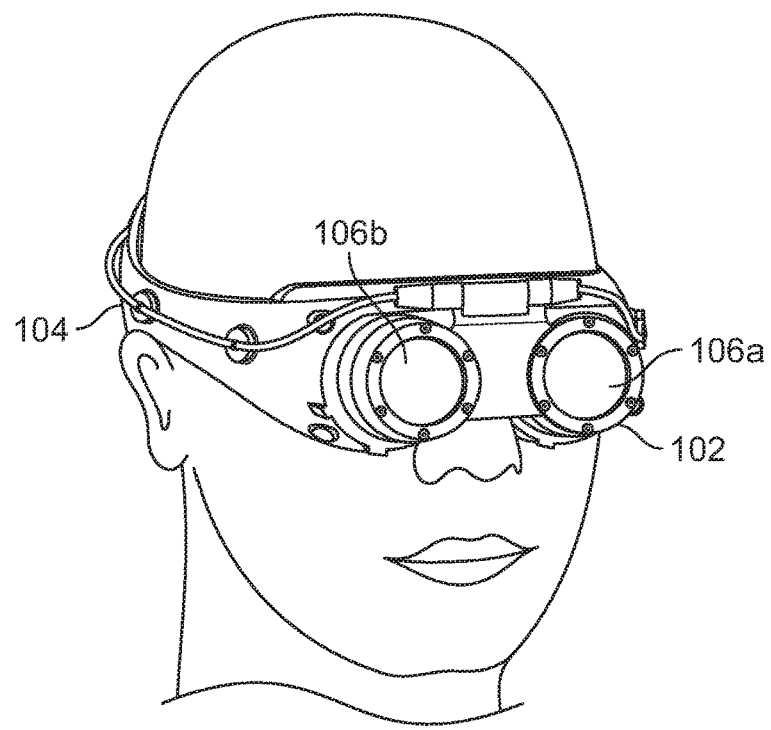
FIG. 1A is a schematic diagram of an immersive headset device being worn in a "flipped-down" position, according to one embodiment.
Figure 1B:
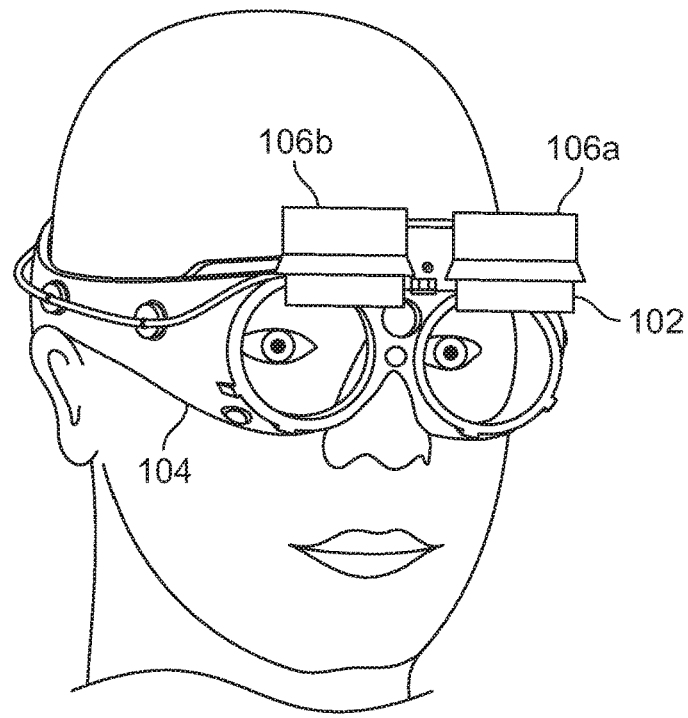
FIG. 1B is a schematic diagram of the immersive headset device of FIG. 1A being worn in a "flipped-up" position, according to one embodiment.

FIGS. 1A-1B are diagrams illustrating examples of this flip-up/flip-down capability. In FIGS. 1A-1B, a user is wearing an example immersive headset 100 featuring examples of the technology disclosed herein. In various embodiments, the headset 100 may include a display portion 102 for housing at least one display, and a body portion 104 adapted to engage a user's head. In this example, the display portion 102 includes a pair of displays (e.g., a left display 106a and a right display 106b) which can be implemented, for example, using microdisplays incorporating a variety of different technologies. For example, LED, OLED, LCD, and other display types can be used. Although in some embodiments two displays may be provided (e.g., one for each eye), in general any number of displays can be provided. For example, a single display to cover both eyes may be used. In embodiments incorporating multiple displays, the displays may present multiple images to the user at the same time. In some cases, different information or content can be provided to different displays. The different content can be provided at the same time, or in some cases a user and/or a controller can elect for only a single content input to be provided at a particular time.

In FIG. 1A, the display portion 102 is shown in an example flipped-down position such that the displays 106a, 106b are in the user's line-of-sight and the information on the displays is presented for viewing to the user. In FIG. 1B, the displays are shown in an example flipped-up position such that they are out of the user's line-of-sight. In the flipped-down position, the headset 100 can be considered to be in the immersive or deployed mode. In other embodiments, the displays 106a, 106b may be pivoted, rotated, or translated to the right or left, outside of the user's field of view.

Any of a number of different mechanisms can be used to allow the displays to be flipped, rotated, or moved. For example, pin-and-barrel type hinge configurations, as well as other hinge or pivot mechanisms, can be used to allow the displays to be flipped up or flipped down as desired. Spiral or torsion springs or other like mechanisms (e.g., a clock spring) can be used to apply pressure to the hinged elements to facilitate movement in one direction while providing some level of resistance to movement in the other direction, or simply to hold the display portion 102 in a particular position. This feature can ensure that a user need not manually hold the display portion 102 in the desired position even in adverse conditions (e.g., while riding in a military vehicle over rough terrain, in an aircraft, etc.). For example, the spring mechanism can be used to hold the display portion 102 in a viewable position in the user's line-of-sight without the display portion 102 jostling or bouncing out of view. Similarly, a spring mechanism can be used to maintain the display portion 102 in the flipped-up position so as to not interfere with the user's line-of-sight (e.g., by jostling or bouncing into the user's field-of-view). Other mechanisms (e.g., snap connectors, latches, catches, detents, ratcheting mechanisms, etc.) can similarly be used to maintain the display portion 102 at a desired position.

Figure 8:
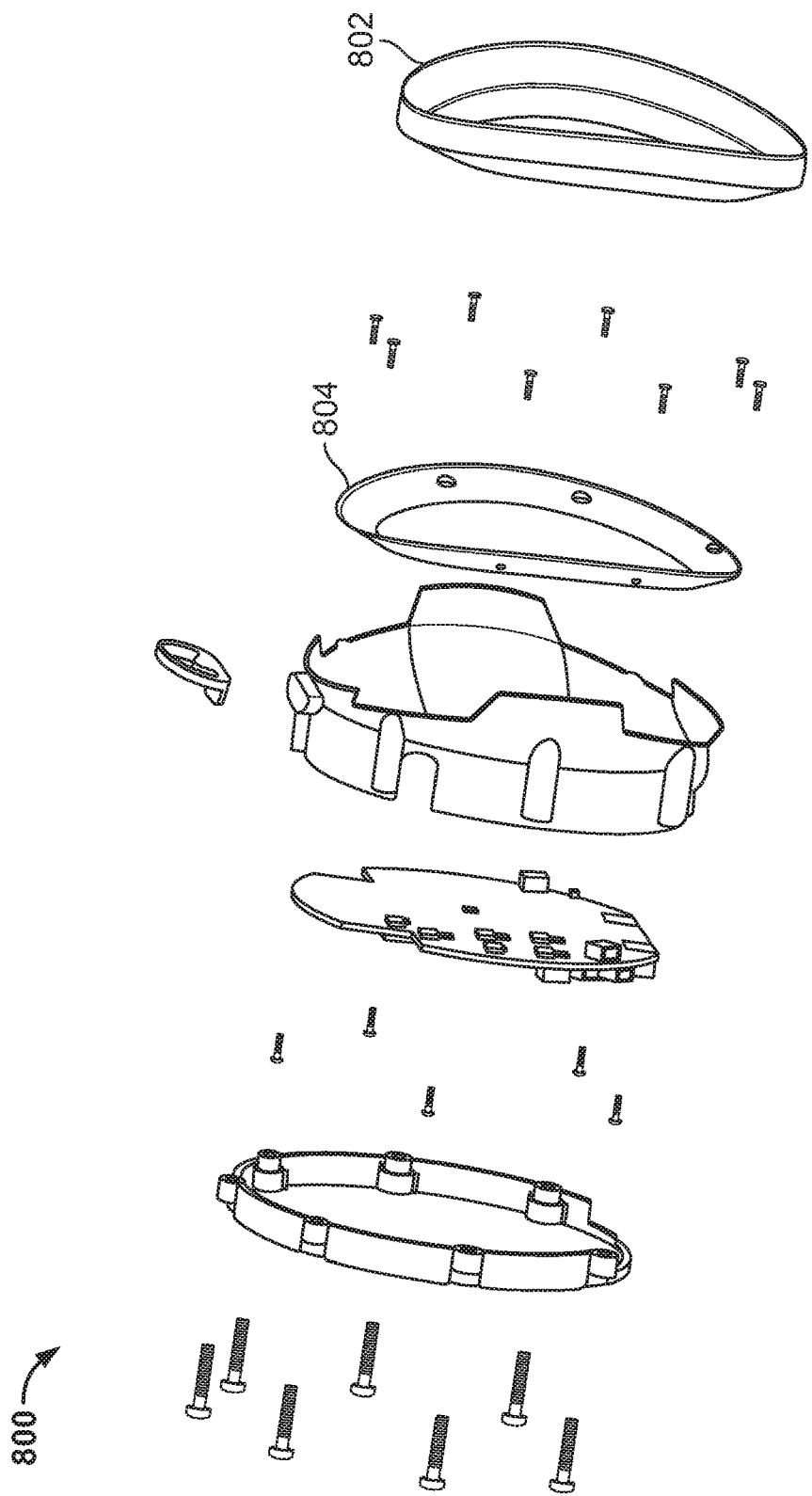
FIG. 8 shows a schematic exploded view of an example display housing, according to one embodiment.

In various embodiments, the display portion 102 and body portion 104 can be configured such that a minimum quantity of exterior light reaches the user's eyes when the display portion 102 is flipped down in the immersive mode. This can help to improve the "signal-to-noise" ratio for the user, and provide a better viewing experience. This can also allow the headset 100 to consume less power by requiring a lesser degree of brightness in the displays to overcome exterior light. FIG. 8 shows an exploded view of an example display housing 800 that can form part of the display portion 102. As shown, foam 802, padding 804, or other compressible or resilient materials can be used to provide a light-tight seal for the headset 100, despite variations in the physical attributes of a particular user (e.g., head shape, bone structure, etc.). In some instances, such sealing materials are furnished in black or flat black to further facilitate limiting external light from entering the interior of the headset 100. As shown in FIGS. 1A and 1B, the entire headset 100 may be black to absorb light and avoid reflections. In other embodiments, the exterior of the headset 100 can be provided in various other different colors including, for example, various camouflage colors and patterns as may be specified by one or more military branches (e.g., Universal Camouflage Pattern (UCP)®, MultiCam®, Desert Camouflage Uniform®, etc.). Regardless of the exterior color, the interior of the headset 100 may be black or flat black, e.g., to avoid or reduce reflections.

Figure 9A:
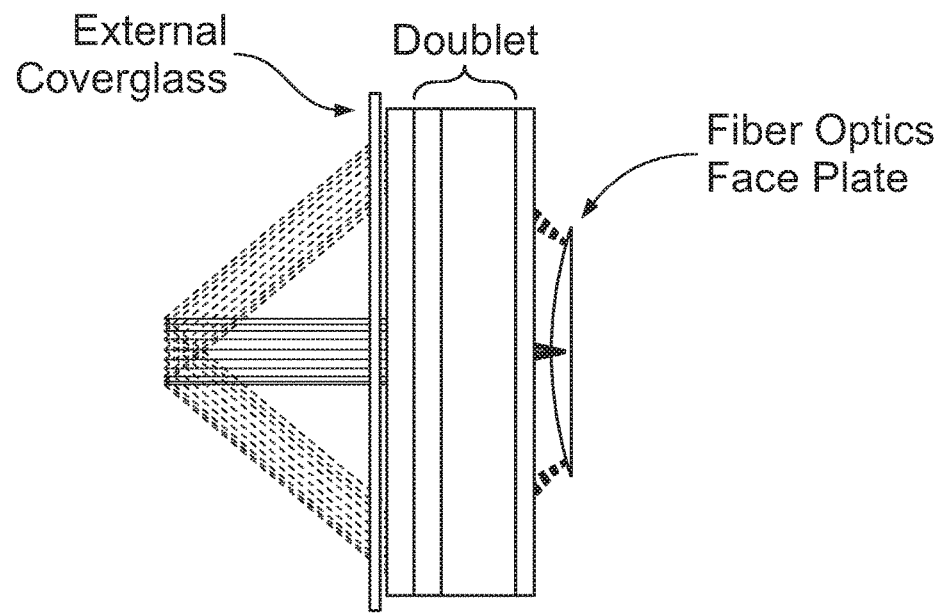
FIGS. 9A-9B show example light travel paths within the optics of displays used in various embodiments.
Figure 9B:
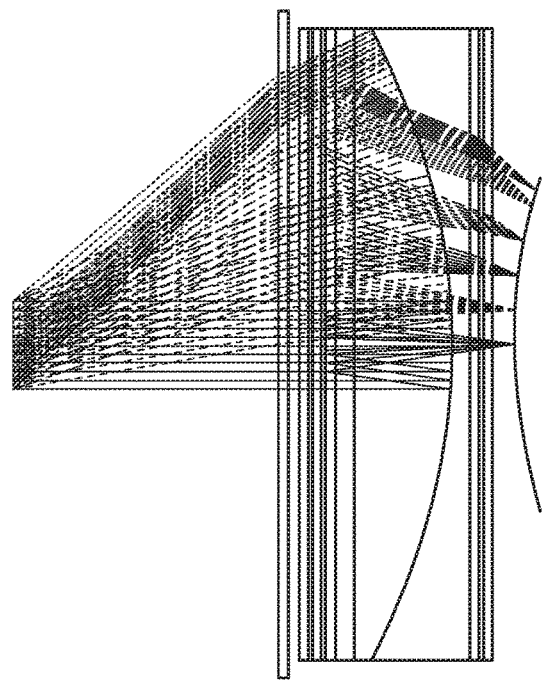

As noted above, the microdisplays 106a, 106b can be of a smaller size than displays currently used in immersive headsets. For example, the microdisplays 106a, 106b can measure in a range from about 0.5 inches to 1.5 inches on the diagonal dimension. Such a small form factor may be possible by taking advantage of co-axial reflective optical systems (sometimes referred to as "pancake optics"). Optical amplification requires light to travel a certain physical distance in order to gain a desired magnification. A co-axial reflective optical system minimizes the geometric space required for the light to travel a particular physical distance by taking advantage of internal reflections within a display housing, which allows the light to travel the required physical distance within the optical system rather than through free space, as with conventional optics. Examples of the light travel paths within the optical system of the displays described herein are shown in FIGS. 9A-9B. This results in a much more compact display. In some embodiments, rectangular displays can be used that include standard aspect ratios such as, for example, 16:9, 4:3, 5:4, 16:10, 256:135, etc. In other embodiments, other form factors can be used for the displays including, for example, circular, ovate, or other symmetrical or irregular shapes.

Figure 7A:
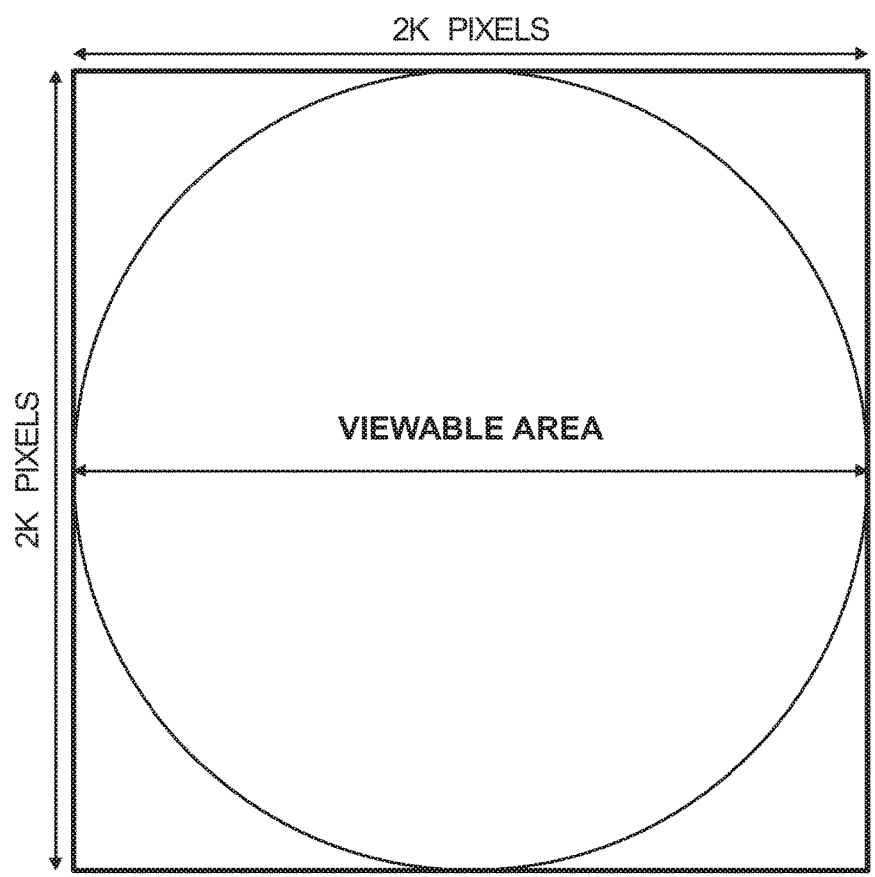
FIGS. 7A-7B show example viewable areas presented by the headset displays, according to various embodiments.
Figure 7B:
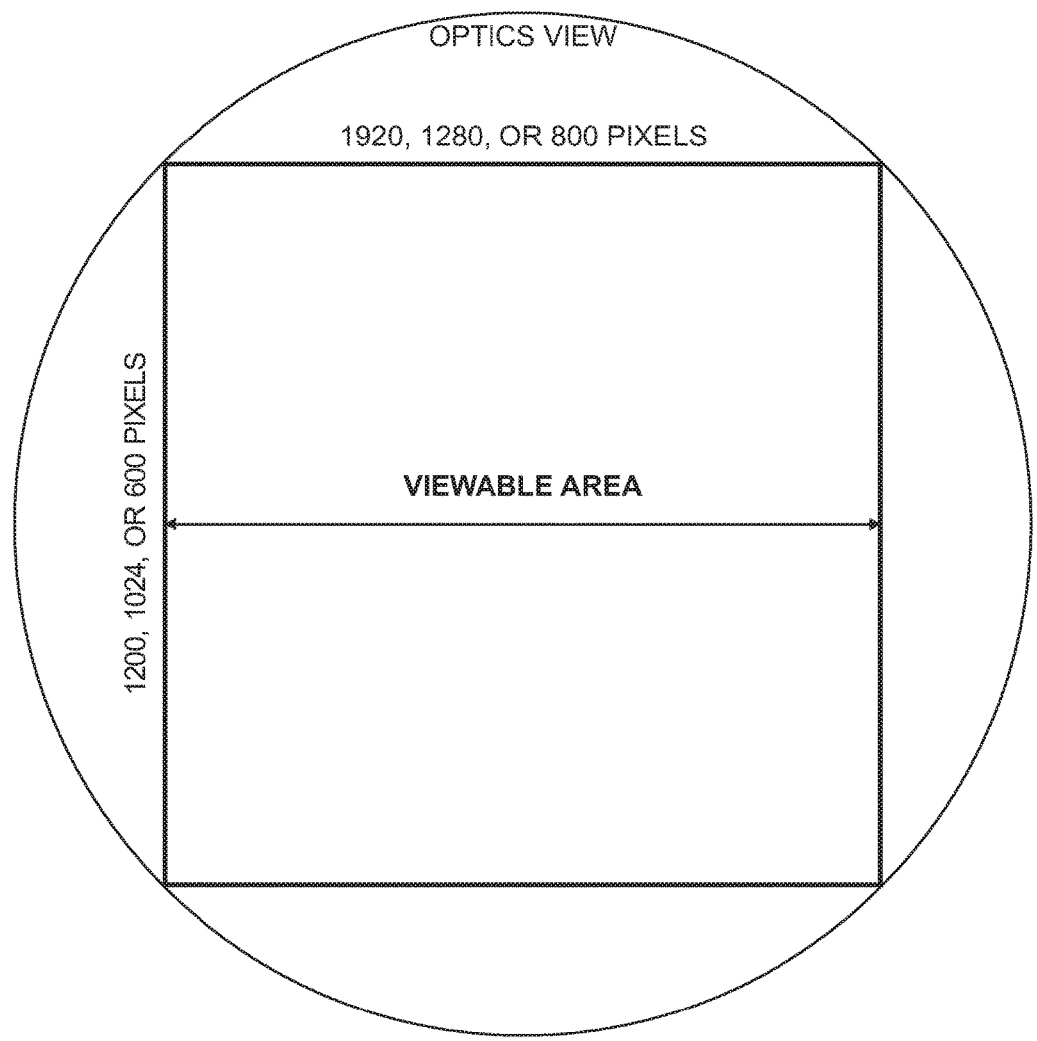

The microdisplays 106a, 106b may be adapted to display images having a number of different resolutions. Some example resolutions include: 1024×576, 1152×648, 1280×720, 1600×900, 1920×1080, 2560×1440, 3840×2160, 1366×768, 1920×1200, 1280×1024, 800×600, 1000×1000, 2000×2000, etc. In some instances, a user's viewable area may be a circumscribed geometry (e.g., a circle) of a particular rectangular (or square) resolution. For example, as shown in FIG. 7A, the user's viewable area may be a circle circumscribed from a square having a 2000×2000 resolution. In other instances, it may be desirable for a user's viewable area to be a rectangular shape. Non-exclusive examples of such instances may include, situations in which menus are presented in the corners of the viewable area, or a cinematic experience in which viewing the entire screen is desirable. In some such instances, the user's viewable area can be the entire display. In other such instances, in order to use the same display as for a circumscribed circle (or other shape) viewable area, the rectangular resolution can be circumscribed out of the circumscribed circle (or other shape). An example of this technique is shown in FIG. 7B. As the above examples illustrate, the microdisplays 106a, 106b may feature a number of different aspect ratios, shapes, and resolutions in various embodiments. FIG. 2 is a chart providing example minimum, maximum, and nominal parameter values for various features of the headset 100.

Figure 3A:
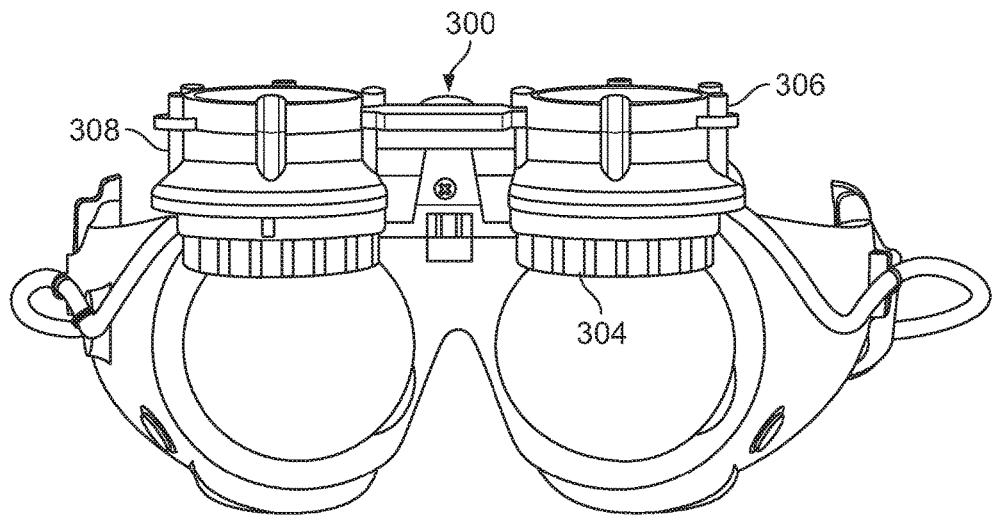
FIG. 3A-3C are schematic perspective views showing various adjustment mechanisms of an example headset, according to various embodiments.
Figure 3B:
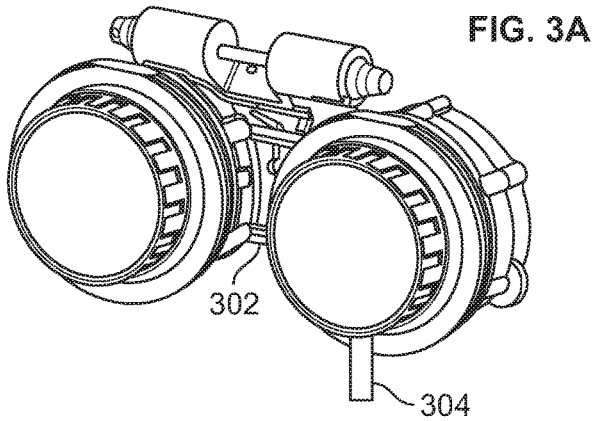
Figure 3C:
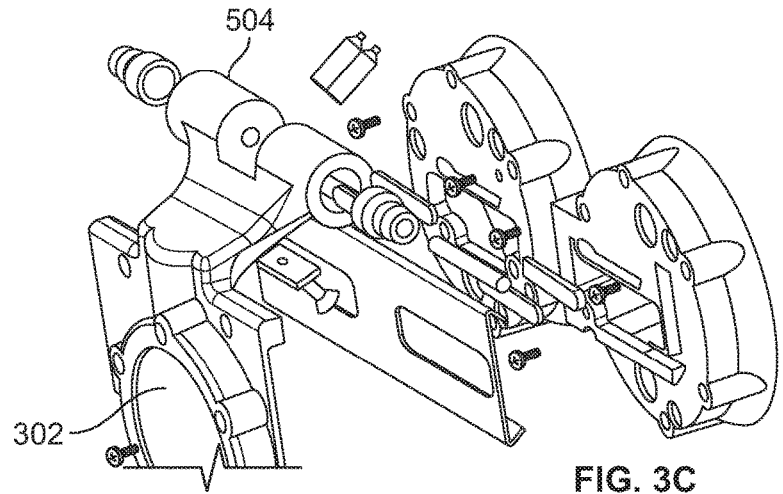

In various embodiments, the headset 100 may also exhibit various adjustment capabilities. Examples of such capabilities are shown in FIG. 3, which shows an interpupillary distance (IPD) adjust mechanism 302, a diopter adjust mechanism 304, an alignment adjust mechanism 306, and an in/out adjustment mechanism 308 (e.g., to accommodate users of differing eye setback profiles). In various instances, the headset 100 described herein can include all, none, or any combination of these adjustment mechanisms. In some instances, some or all of the adjustment mechanisms are positioned with actuation accessible on the exterior of the headset 100 to allow adjustment without the need to remove the headset 100 or change a lens. In some cases the IPD adjust mechanism 302 includes a rail system having detents that hold the displays at various distances apart. In some cases, the independent diopter adjustment 304 can allow users to focus the displays to the user's eyesight, such that the headset 100 can be used without eyeglasses. The various adjustment mechanisms can all be manufactured in a single mechanical structure 300 optimized for use as an OEM module.

Figure 4A:
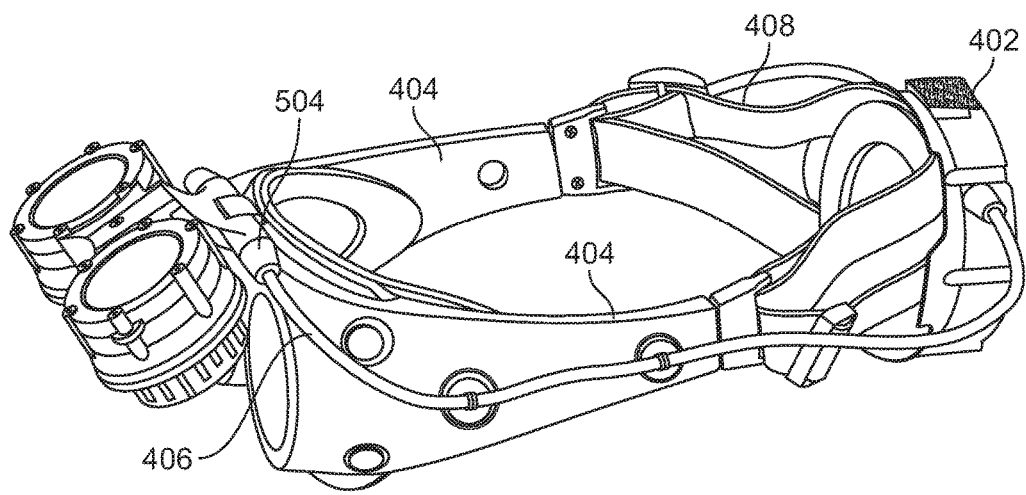
FIGS. 4A-4B show schematic perspective views of an example headset having an electronics source module at the rear, according to one embodiment.
Figure 4B:
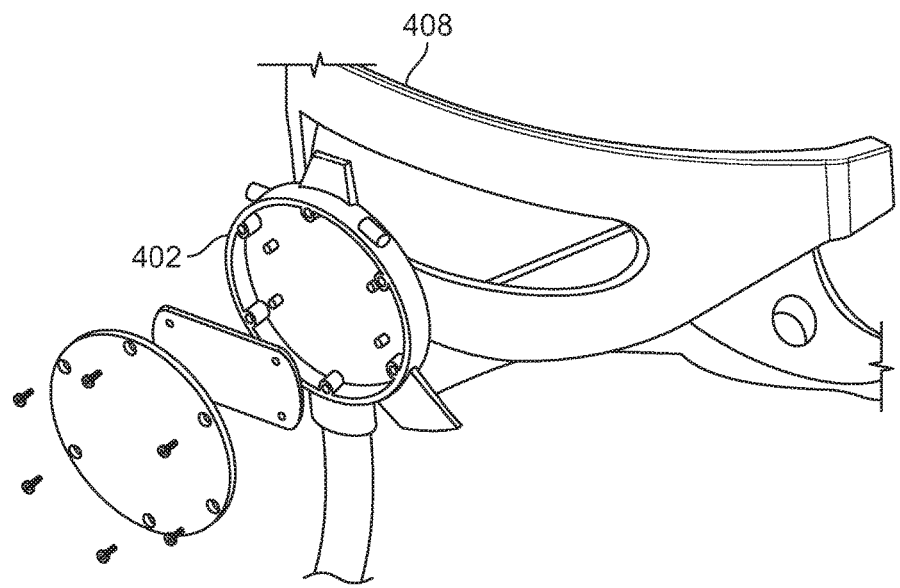

In various embodiments, the headset 100 may include an electronics source module 402, which may include the drive electronics for the microdisplays 106a, 106b. As shown in FIG. 4A, one or more cables 406 can be included and routed from the electronics source module 402 to the displays 106a, 106b to provide signals and/or power to displays 106a, 106b. In some cases, the cables 406 may be routed to the displays through the hinge 504 linking the display portion 102 and the body portion 104 (see also FIG. 3C). The electronics source module 402 may be formed in a puck-shaped disk. In some instances, the disk is located at the rear of the headset 100, which may provide an advantageous weight distribution of the headset 100 about the user's head. Such a weight distribution can offer the user ergonomic and other benefits, not offered by the weight distribution of conventional headsets (e.g., cantilevered towards the front of the user's head). As shown in FIG. 4B, the electronics source module 402 may be located on a support 408 (e.g., head strap, elastic bands, etc.) on the rear of the user's head. Such a support 408 may ensure proper placement of the body portion 104 and the display portion 102 on the head (including the electronics source module 402 and microdisplays 106a, 106b). In certain embodiments, the cables are run from the electronics source module 402 to the displays along semi-rigid side frames 404 of the headset 100. The body portion 104 may include a strap assembly that connects the side frames 404 about the rear of the user's head. In some instances, the electronics source module 402 can provide and/or receive dual, Display Port 1.2 industry-standard inputs/outputs. In other instances, the electronics source module 402 supports single inputs/outputs, either in addition to, or as an alternative from, dual inputs/outputs. The electronics source module 402 may support data at high rates, e.g., up to 4K resolution at 120 Hz, and can support all available 2D and 3D formats.

In other embodiments, drive electronics may be removed from the front of the headset by running electronic cables to drive electronics that are carried, for example, in or on the user's uniform or clothing (e.g., in a backpack or a belt pack). In such embodiments, rather than the electronics source module 402 including the drive electronics themselves (as described above), the electronics source module 402 may collect and route cables to the drive electronics worn by the user.

In some embodiments, an electrical connector can be provided to allow the headset 100 to electrically connect and disconnect from the drive electronics. In some cases, the headset 100 can connect directly to the drive electronics. In other cases, the headset 100 can connect indirectly to the drive electronics via one or more intervening communication paths. Such paths can include, for example, a wearable network that may be embedded in military or civilian clothing. In some embodiments, an electrical connector can be provided to allow the headset 100 to operate wirelessly by receiving signal information (e.g., video, audio, etc.) over a radio frequency or other wireless link. In such embodiments, power may be provided to the headset 100 with batteries, PV cells, capacitor storage cells or other portable power sources.

The headset 100 can further include speakers, transducers, or other actuators to provide sound or vibratory signals to a user. In some instances, the sound can be provided in conjunction with the images provided from the display portion 102. In some embodiments, in addition to, or as an alternative from, conventional speakers, ear buds or other like audio mechanisms may be used. In some cases, bone conduction transducers can be provided to enable delivery of audio content to be a user's inner ear via conduction through one or more bones in the user's head such as, for example, the temporal bone, the occipital bone, the parietal bone, etc.

Figure 5A:
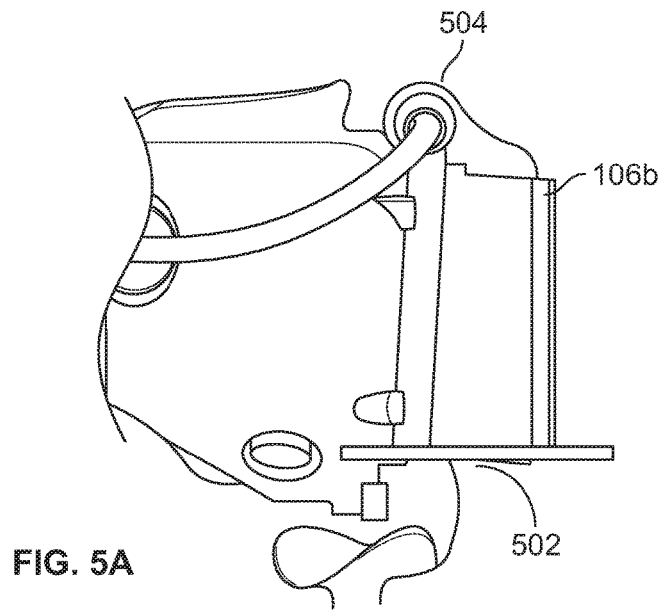
FIGS. 5A-5C show example schematic side exterior, side transparent, and side partial cutaway views of the headset optics in VR mode, according to one embodiment.
Figure 5B:
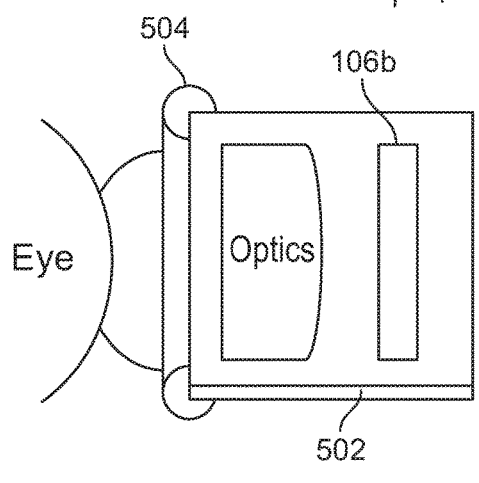
Figure 5C:
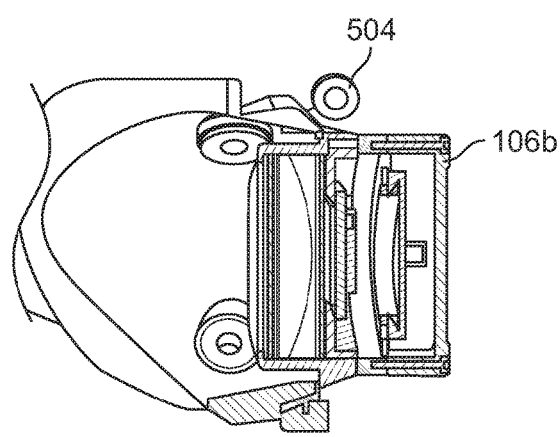
Figure 6A:
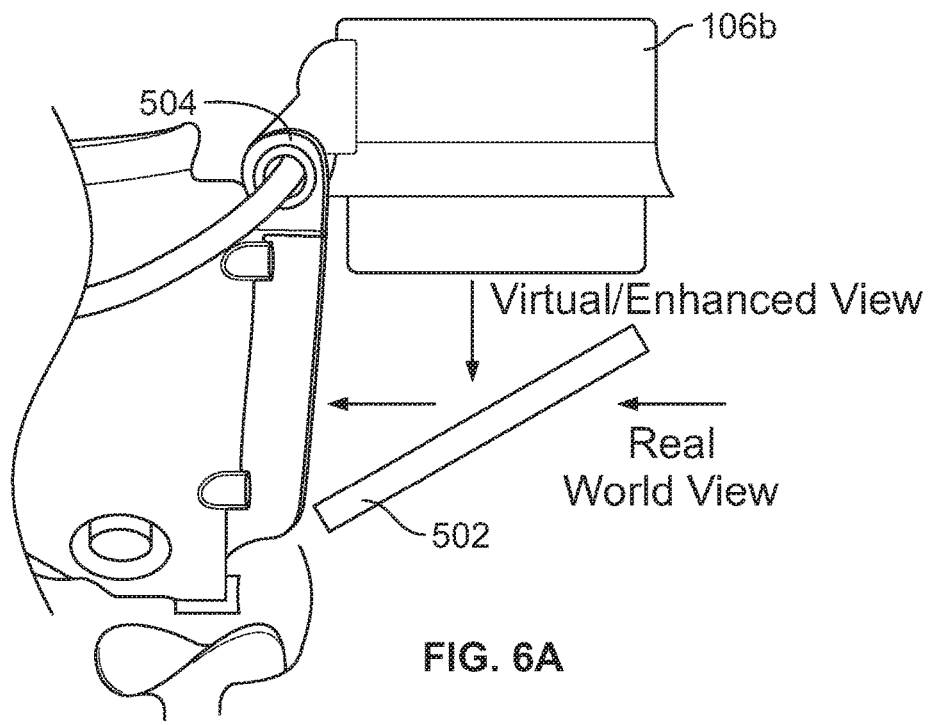
FIGS. 6A-6B show example schematic exterior and transparent views of the headset optics in AR mode, according to one embodiment.
Figure 6B:
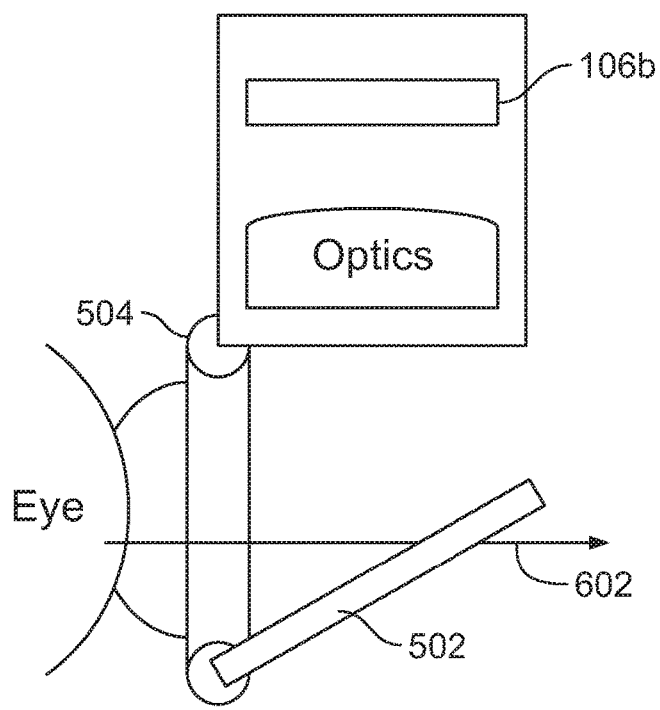

In various embodiments, the flip-up/flip-down capability allows the headset 100 to feature a VR mode, when the display portion 102 is in the flipped-down position, and an AR mode, when the display portion 102 is in the flipped-up position. FIGS. 5A-5C show an example configuration of the headset in VR mode, and FIGS. 6A-6B show an example configuration of the headset in AR mode. In general, in such embodiments, when the display portion 102 is in VR mode, the displays 106a, 106b are in a line-of-sight of the user, and when the display portion 102 is in AR mode, the displays 106a, 106b are displaced from the line-of-sight of the user while still providing an image to the user. In order to provide an image to the user in AR mode, the displays 106a, 106b may reflect an image off a reflective structure to the user. In such embodiments, the device may feature a flat plate combiner 502 having both transmissive and reflective properties. In some cases, the flat plate combiner 502 features a partially reflective surface, an angular reflective surface, and/or a notch coating applied to optimize these properties. As shown in FIGS. 5A-5B, the flat plate combiner 502 may not be used in the VR mode, as the user's eye is directly in line with the displays 106a, 106b. But in AR mode, as shown in FIGS. 6A-6B, the flat plate combiner 502 may rotate into an angled position from which it (i) is transmitted by the user's line-of-sight 602; and (ii) reflects an image from the displays 106a, 106b. Thus, in AR mode, a user can both see into the real world and be presented with virtual and/or enhanced optics. As one illustrative example of this feature, a user may be able to see the real world but also be presented with a virtual display (e.g., at the peripherals of the user's view) of certain external parameters (e.g., temperature, wind speed, date/time, etc.).

In order to transition between VR mode and AR mode, the flat plate combiner 502 may rotate about a hinge 504. Various structures can be used to drive the flat plate combiner 502 to ensure that it is reliably and repeatable positioned in the correct position (e.g., a linkage structure, a cam and follower, a rack and pinion, etc.). In the AR mode, the correct position may be the correct angle to ensure that a user can see through the combiner 502, and that the combiner 502 can properly reflect the displayed image. In the VR mode, the correct position may be a position in which the combiner's optical surfaces are protected (e.g., by the display housing).

In some embodiments, the electronics source module 402 (or other electronic/software system) can determine when the headset 100 is in AR mode or VR mode and adjust the image parameters accordingly. For example, when the headset 100 is in AR mode, the displays may be subject to more ambient light, which can require that the images be presented with altered (e.g., higher) brightness, contrast, sharpness, and/or other image parameters. As another example, because the displays change orientation during the transition between AR mode and VR mode, such a transition may require that the image be flipped (an image flip), so that it is displayed in the correct orientation in both modes. In various embodiments, the electronics source module 402 (or other electronics/software) can make these adjustments, and other adjustments, based on a determination of whether the headset 100 is in AR mode or VR mode.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

The technology disclosed herein, in accordance one or more various embodiments, is described in detail with reference to the included drawings. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. The invention can be practiced with modification and alteration, and that the disclosed technology be limited only by the claims and the equivalents thereof. It should be noted that for clarity and ease of illustration these drawings are not necessarily made to scale. Other features and aspects of the disclosed technology are apparent from the above detailed description, taken in conjunction with the accompanying drawings, which illustrate, by way of example, the features in accordance with embodiments of the disclosed technology.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An immersive headset device comprising:
   a body portion adapted to be worn on a head of a user;
   a display portion attached to a front of the body portion proximate at least one eye of the user to permit viewing of the display portion with the eye of the user, the display portion comprising at least one OLED display comprising a diagonal dimension in a range from 0.5 to 1.5 inches and adapted to display an image having a display resolution of at least 2k×2k pixels; and
   an electronics source module for housing at least one of power and display signal electronics operatively connected to the display portion.

2. The immersive headset of claim 1, wherein the body portion comprises semi-rigid side frame members.

3. The immersive headset of claim 2, wherein the body portion further comprises a strap assembly adapted to connect the semi-rigid side frame members about a rear of the head, the electronics source module forming part of the strap assembly.

4. The immersive headset of claim 3, wherein the electronics source module is shaped to hold the strap assembly in an appropriate location on the head.

5. The immersive headset of claim 1, wherein the display portion further comprises a diopter adjust mechanism and an interpupillary distance adjust mechanism.

6. The immersive headset of claim 5, wherein at least one of the diopter adjust mechanism and the interpupillary distance adjust mechanism is adapted to be adjusted without removing the headset from the head of the user.

7. The immersive headset of claim 1, wherein the at least one OLED display comprises two OLED displays comprising one OLED display proximate each eye of the user.

8. The immersive headset of claim 7, wherein each OLED display is adapted to receive an independent input from the electronics source module.

9. The immersive headset of claim 1, wherein the display portion is adapted to move between an immersed position in which the display is in a line-of-sight of the user and a non-immersed position by rotating with respect to the body portion.

10. The immersive headset of claim 9, further comprising a hinge mechanism adapted to rotate the display portion with respect to the body portion.

11. The immersive headset of claim 9, further comprising a holding structure adapted to maintain the display portion in at least one of the immersed position and the non-immersed position.

12. The immersive headset of claim 11, wherein the holding structure is selected from the group consisting of a spring mechanism, a snap connector, a latch, a catch, a detent, and a ratcheting mechanism.

13. The immersive headset of claim 1, wherein the electronics source module forms a disk shape.

14. The immersive headset of claim 1, wherein the electronics source module is adapted to provide data in both 2D and 3D formats.

15. The immersive headset of claim 14, wherein the electronics source module is adapted to provide the data at up to 4 k resolution at 120 Hz.

16. The immersive headset of claim 1, wherein the electronics source module is adapted to provide at least one of a single and a dual output.

17. The immersive headset of claim 1, wherein the display portion further comprises a co-axial reflective optical system.

18. The immersive headset of claim 1, wherein the display portion further comprises a doublet lens between the OLED display and an eye of the user.

19. The immersive headset of claim 18, wherein the display portion further comprises an external coverglass between the OLED display and the doublet lens.

20. The immersive headset of claim 18, wherein the display portion further comprises a fiber optic face plate disposed between the doublet lens and the eye of the user.

21. A method of configuring an immersive headset device, the method comprising the steps of:
    providing a body portion adapted to be worn on a head of a user;
    providing a display portion attached to a front of the body portion proximate at least one eye of the user to permit viewing of the display portion with the eye of the user, the display portion comprising at least one OLED display comprising a diagonal dimension in a range from 0.5 to 1.5 inches and adapted to display an image having a display resolution of at least 2k×2k pixels; and
    operatively connecting an electronics source module for housing at least one of power and display signal electronics to the display portion.

22. The method of claim 21, further comprising programming the electronics source module to provide data to the display portion in both 2D and 3D formats.

23. The method of claim 21, wherein the body portion comprises semi-rigid side frame members.

24. The method of claim 23, further comprising interconnecting the semi-rigid side frame members about a rear of the head with a strap assembly, the electronics source module forming part of the strap assembly.

25. The method of claim 21, wherein the at least one OLED display comprises two OLED displays comprising one OLED display proximate each eye of the user.

26. The method of claim 25, further comprising interconnecting each OLED display to the electronics source module with an independent input.

27. The method of claim 21, wherein the display portion is adapted to move between an immersed position in which the display is in a line-of-sight of the user and a non-immersed position by rotating with respect to the body portion.

28. The method of claim 27, further comprising providing a holding structure adapted to maintain the display portion in at least one of the immersed position and the non-immersed position.

29. The method of claim 21, further comprising interconnecting the electronics source module to the display portion with at least one cable.

30. The method of claim 21, wherein the display portion further comprises a doublet lens between the OLED display and an eye of the user.

31. The method of claim 30, wherein the display portion further comprises an external coverglass between the OLED display and the doublet lens.

32. The method of claim 30, wherein the display portion further comprises a fiber optic face plate disposed between the doublet lens and the eye of the user.

* * * * *

UNITED STATES PATENT AND TRADEMARK OFFICE
CERTIFICATE OF CORRECTION

PATENT NO. : 10,345,602 B2
APPLICATION NO. : 15/646390
DATED : July 9, 2019
INVENTOR(S) : Jerome T. Carollo et al.

Page 1 of 1

It is certified that error appears in the above-identified patent and that said Letters Patent is hereby corrected as shown below:

On the Title Page

Under Item (73) listing the Assignee, please delete "Sun Pharmaceutical Industries Limited, Mumbai (IN)" and add -- "eMagin Corporation, Hopewell Junction, NY (US)" --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*